United States Patent [19]

Sekiwa et al.

[11] Patent Number: 4,922,309
[45] Date of Patent: May 1, 1990

[54] SPECTROSCOPE

[75] Inventors: Mitsunao Sekiwa, Hirakata; Tomohiro Akada, Kadoma, both of Japan

[73] Assignee: Otsuka Electronics Co., Ltd., Osaka, Japan

[21] Appl. No.: 267,884

[22] Filed: Nov. 7, 1988

[30] Foreign Application Priority Data

Nov. 9, 1987 [JP] Japan ................................ 62-282769

[51] Int. Cl.$^5$ .............................................. G01J 3/02
[52] U.S. Cl. .................................... 356/300; 356/328; 356/334
[58] Field of Search ............... 356/300, 319, 323, 325, 356/326, 328, 331, 332, 334; 350/400

[56] References Cited

U.S. PATENT DOCUMENTS

| 4,012,147 | 3/1977 | Walrafen | 356/326 |
| 4,164,373 | 8/1979 | Schuss et al. | 356/328 X |
| 4,487,504 | 12/1984 | Goldsmith | 356/323 |
| 4,556,293 | 12/1985 | Burns et al. | 350/400 |

FOREIGN PATENT DOCUMENTS

| 61-59236 | 3/1986 | Japan. |
| 1335657 | 10/1973 | United Kingdom. |
| 2186363 | 8/1987 | United Kingdom. |

OTHER PUBLICATIONS

Lishanskii et al., Journal of Applied Spectroscopy, vol. 29, No. 4, Oct. 1979, pp. 1269 and 1270.
LaSalle et al., Optics Communications, vol. 17, No. 3, Jun. 1976, pp. 325–327.

Primary Examiner—F. L. Evans
Attorney, Agent, or Firm—Sughrue, Mion, Zinn, Macpeak & Seas

[57] ABSTRACT

An optical waveguide having a detour is disposed at either or both of the light-receiving and light-emitting ends of a dispersion optical system in a spectroscope. Even though light being propagated through the optical waveguide has specified polarizing characteristics, the light is depolarized by passing through the optical waveguide and many times reflecting therein. Accordingly, unpolarized light not affected by the polarization selectivity of the dispersion optical system or the like can be emitted from the spectroscope.

2 Claims, 3 Drawing Sheets

SPECTROSCOPE

BACKGROUND OF THE INVENTION

The present invention relates to a spectroscope, and more particularly to a spectroscope capable of obtaining dispersed light from a dispersion optical system through which irradiated light from a light source, or reflected light or transmitted light from a sample to be tested, or the like (hereinafter referred to as sample light) is guided.

Dispersed light obtained by guiding sample light through a dispersion optical system sometimes shows polarizing characteristics depending on a wavelength. The reason of this is that a diffraction grating or a prism is generally disposed in a dispersion optical system and emitting light intensity varies in accordance with different polarization planes. Therefore, when employing light of a specified wavelength as sample light, accurate and precise optical measurement sometimes cannot be made because of the polarizing characteristics of the dispersed light.

A photoelectric conversion element for selectively converting a light of a specified wavelength among the dispersed lights into an electric signal, itself often has polarizing characteristics. Accordingly, the level of observation data varies according to the polarizing direction of the dispersed light in the case the dispersed light has polarizing characteristics.

To summarize the foregoing, when the polarizing characteristics of a dispersion optical system or a photoelectric conversion element or the like depend on a wavelength, the original spectrum form will be modulated by the above polarizing characteristics with the result that an accurate spectral data cannot be obtained.

In a conventional spectroscope, an optical depolarizing element is disposed at the input end or the output end of a dispersion optical system in order to reduce the influence of the polarizing characteristics of light as much as possible. Such an optical depolarizing element may be, for example, a depolarizer or an integrating sphere into which light is projected by light projecting means such as an optical fiber. The light projected into the above integrating sphere is many times reflected at the inner surface thereof and then taken out therefrom. In both cases, the polarization can be equally distributed to every polarizing direction without being converged on a specified polarizing direction. The average light intensity can be obtained in any polarizing direction by passing light through a depolarizer or an integrating sphere even though the incident light has polarizing characteristics.

However, when employing a depolarizer, only one depolarizer is not enough to achieve perfect depolarization, so it is required to use several depolarizers one over another. This costs much since the depolarizers are made of expensive crystal.

When employing an integrating sphere, it is necessary to take out the light which has been blocked in the integrating sphere by an optical fiber. The reflection rate of the reflecting layer made of barium sulfate or the like which is applied to the inner surface of the integrating sphere, greatly depends on the wavelength. More specifically, the reflection rate of the reflecting layer becomes lower as the light incident on the reflecting layer is closer to the ultraviolet region (see FIG. 5), and therefore the loss of light amount will be increased if light closer to the ultraviolet region is incident on the integrating sphere. The fact that the integrating sphere is not in a perfect spherical shape also causes further loss of light amount. Since the light amount decreases while the loss amount increases, S/N (signal-to-noise ratio) of measuring data decreases. To replenish the loss of light amount, the amount of projected light has to be increased; that is, a light source having a large capacity will be required, which dissipates high electric power being accompanied with an increase in heat generation. Consequently, trouble will be more likely to occur.

SUMMARY OF THE INVENTION

It is an object of the present invention to provide a spectroscope for emitting dispersed light after guiding sample light into a dispersion optical system thereof, whereby accurate and precise photometry, colorimetry and spectral diffraction can be achieved.

When light is many times reflected in an optical waveguide in the case of being transferred, such a phenomenon generally tends to appear that a propagating mode is converted into another mode having a different polarization plane and that polarizing direction breaks out because of the irregularity of the inner part of the optical waveguide. Hence, it has been one of problems to be solved how to maintain polarization in an optical waveguide. In the present invention, however, the above-described phenomenon is advantageously utilized. That is:

The spectroscope in accordance with the present invention for achieving the foregoing object is provided with an optical waveguide having a detour at either or both of the light-receiving and light-emitting ends of a dispersion optical system. The shape of the optical waveguide having a detour may be any shape provided that light can be detoured through it and many times reflected therein, such as a spiral, volution and wave.

With use of the spectroscope of the present invention, even if the incident light on the dispersion optical system or the emitting light from the same has specific polarizing characteristics, such light can be depolarized by reflecting many times while passing through the optical waveguide having a detour.

More specifically, light is passed through the optical waveguide which is winded into a spiral, volute or wavelike shape thereby causing the light to be reflected many times therein (see FIG. 2(a), in which the light is reflected four times) and mode conversion is actively caused, so that the light polarized in one direction can be converted into unpolarized light.

The advantages of the invention will become further apparent from the following description taken in conjunction with the accompanying drawings, in which:

DETAILED DESCRIPTION OF THE PREFERRED EMBODIMENTS

Figure 1:
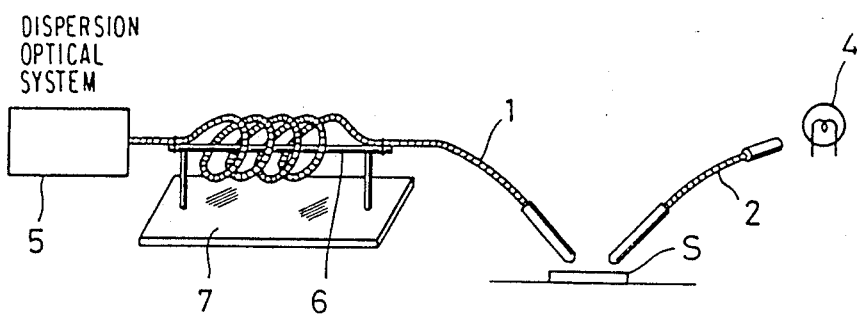
FIG. 1 is a schematic view showing an embodiment of the spectroscope of the present invention.

FIG. 1 is a schematic view illustrating an example of the spectroscope of the present invention wherein by light projecting optical fiber 2, a beam emitted from light source 4 is irradiated onto sample S to be tested, and the reflected light from sample S to be tested is collected by light-receiving optical fiber 1 and guided to dispersion optical system 5.

As illustrated in the figure, light-receiving optical fiber 1 is spirally wound around rod 6 and this spirally wound portion is the optical waveguide having a detour. The reference numeral 7 represents a stand which secures rod 6.

In a spectroscope having the above-described arrangement, polarized reflected light from sample S is many times reflected while passing through light-receiving optical fiber 1. Each time the light is reflected, a part of the propagating light is converted into a different mode, and mode elements having a different polarization plane thus increase. In other words, light passes through light-receiving optical fiber 1 thereby the polarization plane of the reflected light from sample S to be tested being equalized without converging in a specified direction. Thus, accurate and precise photometry, colorimetry or spectral diffraction can be accomplished even though the dispersion optical system has polarizing selectivity. Moreover, a long and fine optical waveguide, i.e., an optical fiber is employed in this embodiment as an example of the optical waveguide, a rectilinear optical waveguide, so that the optical waveguide is easily detoured in various forms and wound around rod 6.

Depolarization can be increased by increasing the number of curvature of optical fiber or enlarging the curvature itself. In both cases, no special space is required. Accordingly, the entire device with the above arrangement can be very compact.

Figure 2:
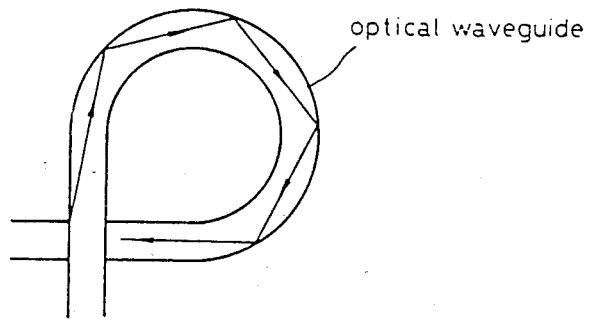
FIG. 2(a) is an explanatory illustration showing light reflected many times in a winding optical waveguide while passing through the same.
FIG. 2(b) is an explanatory illustration showing light reflected in a rectilinear optical waveguide while passing through the same.
Figure 2:

The present invention is not limited to the above-described embodiment. For example, a winding optical fiber may be disposed at the light-emitting end of dispersion optical system 5. A dispolarizer in an optical waveguide is not necessarily limited to a winding optical fiber but may be a rectilinear optical fiber. In this case, although depolarization rate per unit length is decreased, depolarization can be achieved by employing a rectilinear optical fiber having sufficient length (see FIG. 2(b) where the number of reflections is two times less than that of FIG. 2(a)).

Instead of an optical fiber, an optical waveguide spirally formed on the side face of a cylindrical substrate, or an optical waveguide formed in the form of wave or volution on a flat substrate, may be employed.

While the present invention has been described hereinabove in detail with reference to the accompanying drawings, it should be understood that the present invention is not limited to the specific embodiments, and various changes and modifications are possible without departing from the scope of the invention.

In the spectroscope of the present invention, an optical waveguide having a detour is disposed at either or both of the light-receiving and light-emitting ends of a dispersion optical system. The light having a specified polarizing characteristics, therefore, takes a long way by passing through the optical waveguide so as to be reflected therein resulting in depolarization. The resultant loss of light amount is lessened as well as the consumed power of the light source, comparing with the case in which an integrating sphere or the like is conventionally employed. Accordingly, even though a dispersion optical system has polarizing selectivity, emitted light which is not affected by the polarizing selectivity can be obtained. Besides that, this enables to achieve photometry and colorimetry which are not affected by polarizing characteristics even when the spectroscope is used as a spectrometer. As a result, the measurement is highly improved.

EXPERIMENT

An experimental result will be hereinafter explained in which depolarizing characteristics of a winding optical fiber were measured.

Figure 3:
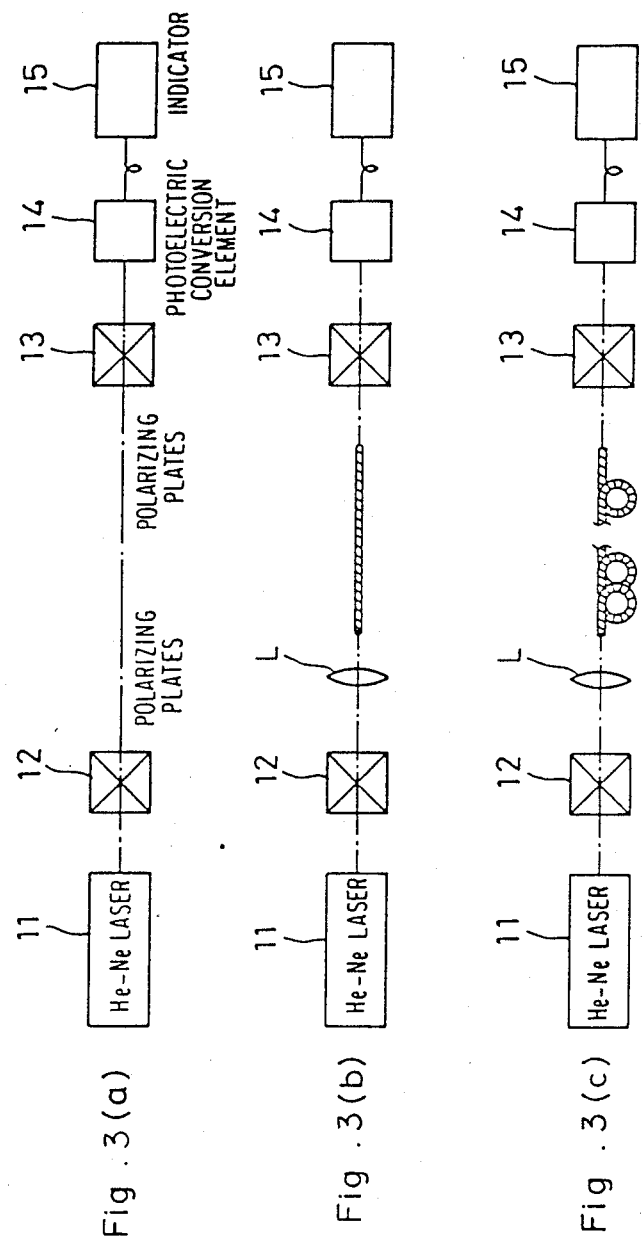
FIG. 3 is a schematic view showing an experimental device by which the depolarizing characteristics of a winding optical fiber is actually measured.

FIG. 3 shows an optical system used in the experiment, wherein irradiated light from He-Ne laser 11 having a capacity of 2 mW is passed through polarizing plates 12 and 13, received by photoelectric conversion element 14, and then converted into an electric signal which will be indicated by indicator 15. Polarizing plate 13 is disposed to be 180 rotatable on the optical axis.

FIGS. 3(a), 3(b) and 3(c) respectively show a case where nothing is interposed between polarizing plates 12 and 13, a case where a rectilinear optical fiber 80 cm-long is interposed therebetween, and a case where a spirally winding optical fiber 80 cm-long is interposed therebetween.

Figure 4:
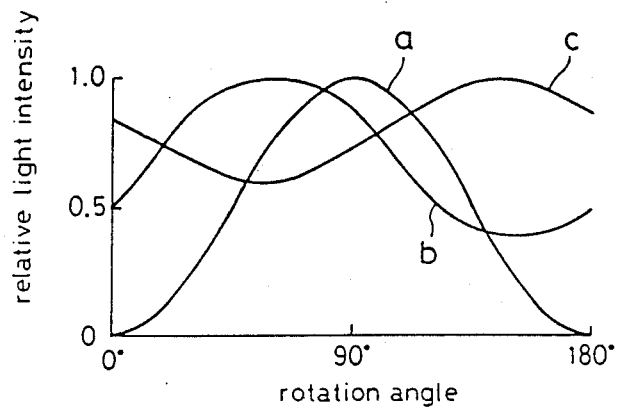
FIG. 4 is a graph showing data of the experiment carried out with the device shown in FIG. 3.
Figure 5:
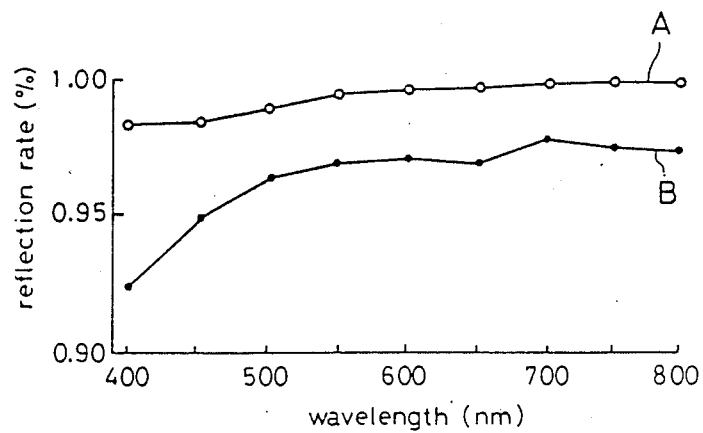
FIG. 5 is a graph showing the reflection rate of barium salfate which is applied to the inner wall of a conventional intergrating sphere, where line A indicates the most appropriate reflection rate and line B indicates not-so-good reflection rate.

First, the light intensity was measured with respect to the case shown in FIG. 3(a) where nothing is interposed between polarizing plates 12 and 13. Coherent light was irradiated from He-Ne laser 11 and then polarizing plate 13 was rotated form −90 to +90 with respect to the polarizing direction of polarizing plate 12. Curved line a in FIG. 4 shows the level indicated by indicator 15.

Second, the light intensity was measured under the same procedure as the first measurement with respect to the case shown in FIG. 3(b) where a rectilinear optical fiber 80 cm-long is interposed. As shown by curved line b in FIG. 4, the light intensity is not zero at the minimum point and the difference between the maximum level and the minimum level is around 0.6 when the maximum level was nomalized to 1.

Finally, the light intensity was measured likewise with respect to the case shown in FIG. 3(c) where a spirally winding optical fiber 80 cm-long is interposed. As shown by curved line c in FIG. 4, the difference between the maximum level and the minimum level is around 0.4 when the maximum level is nomalized to 1.

As apparent form the foregoing, depolarization can be achieved even when a rectilinear optical fiber is interposed, and the effect of depolarization in the case where a optical fiber having a detour is interposed is greater than that of the case where a rectilinear fiber is employed.

What is claimed is:
1. A spectroscope for analyzing a sample, comprising:
    means for irradiating light on said sample;
    means for receiving and depolarizing reflected light from said sample, said depolarizing means comprising an optical wave guide in the form of a spiral such that light is multiply reflected in said wave guide so as to depolarize said light; and
    a dispersion optical system having a grating for emitting said depolarized light at every wavelength when said light is impinged thereto.
2. A spectroscope according to claim 1 wherein said optical waveguide is in a form of an optical fiber.

* * * * *